Aug. 8, 1967  R. GAUTHIER  3,334,387
ZIP FASTENER
Filed Oct. 28, 1964  2 Sheets-Sheet 1
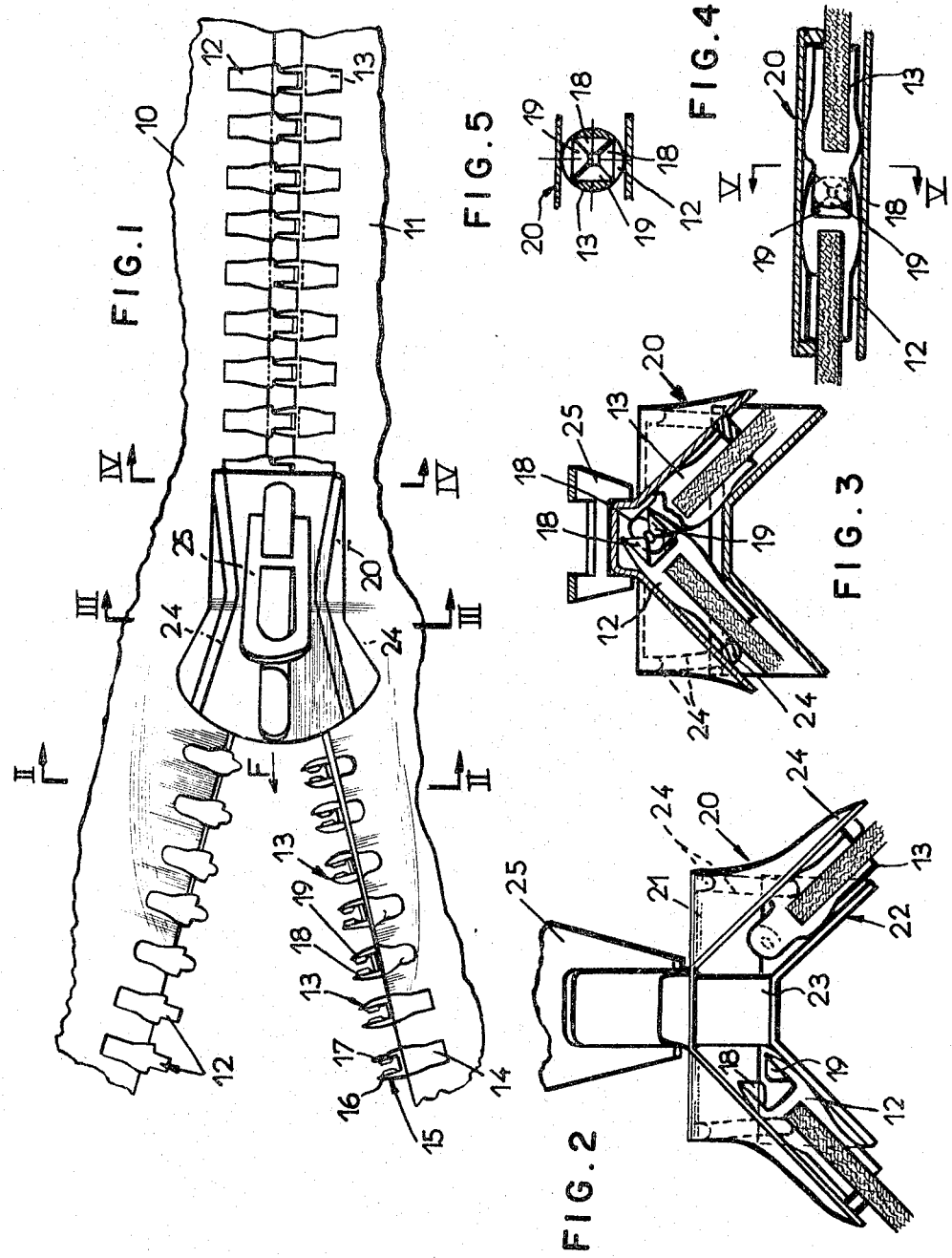
INVENTOR
ROBERT GAUTHIER Aug. 8, 1967     R. GAUTHIER     3,334,387
ZIP FASTENER
Filed Oct. 28, 1964     2 Sheets-Sheet 2
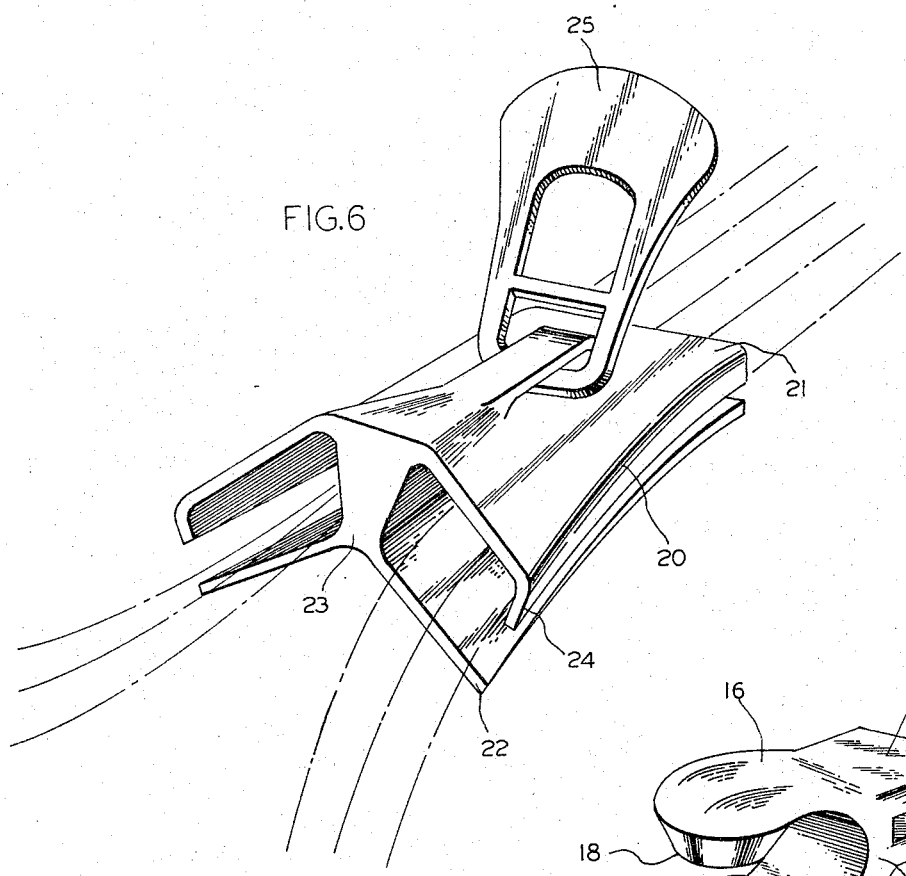
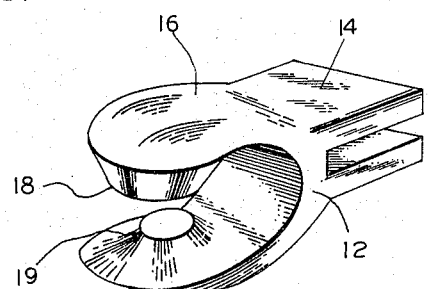
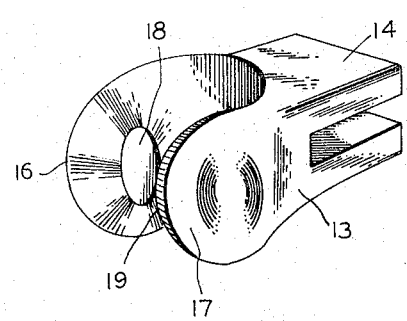
INVENTOR
ROBERT GAUTHIER
BY *Shermane Shalloway*
ATTORNEYS

United States Patent Office 3,334,387
Patented Aug. 8, 1967

3,334,387
ZIP FASTENER
Robert Gauthier, 32 Ave. du General Michel Bizot, Paris, France
Filed Oct. 28, 1964, Ser. No. 407,132
Claims priority, application France, Oct. 29, 1963, 952,200
16 Claims. (Cl. 24—205)

The present invention has for its principal object a fastening device of the zipper type.

It is known that the usual zip fasteners generally comprise a number of identical elements mounted opposite each other along the edges of two strips which are to be joined, each element of one strip engaging with two elements of the other strip to close the fastener. The inter-engagement or disengagement of the elements is effected by means of a slider, whereby the elements of one strip are moved closer to or apart from the elements of the other strip.

Fasteners of this type have the disadvantage that, when some element of one strip happens to be disengaged from the two co-acting elements of the other strip, it cannot practically be re-positioned and the whole fastener will gape, thus becoming unusable.

The purpose of the present invention is to provide a zip fastener which is free of such disadvantages, said fastener pertaining to the type which includes coupling elements mounted along the edges of the bands, strips, fabrics or the like to be joined, and adapted to co-act by pairs, independently of the other coupling elements of the fastener.

A fastener of the zipper type according to the invention includes two facing one another bands, joining elements on the edges of said bands each joining element mounted on one band facing one co-operating element mounted on the other band, each joining element having the shape of a yoke provided with two internal side lugs facing each other, the plane of symmetry passing by the legs of said yoke of one element being normal to that plane of symmetry of said corresponding co-operating element.

Other features of the invention will become apparent from the following description.

In the accompanying drawings, given by mere way of example and illustrating one embodiment of the zip fastener according to the invention:

FIGURE 1 is a plane view from above of a zip fastener according to the invention;

FIGURE 2 is a sectional view along line II—II of FIGURE 1;

FIGURE 3 is a sectional view along line III—III of FIGURE 1;

FIGURE 4 is a sectional view along line IV—IV of FIGURE 1;

FIGURE 5 is a sectional view along line V—V of FIGURE 4;

FIGURE 6 is a perspective view of a slider according to the invention;

FIGURE 7 is a perspective view of a single fastener element according to the invention, and FIGURE 8 is a perspective view of another single fastener element according to the invention.

In FIGURE 1, which illustrates one embodiment of the zip fastener according to the invention, there is shown at 10 and 11 respectively, two strips of fabric or the like, which are joined together by means of the zip fastener according to the invention. Mounted along the edges of strip 10 are a plurality of coupling elements 12, while along the edges of strip 11 are another plurality of elements 13, intended to co-act with the elements 12 of strip 10. Elements 12 and elements 13 include a body portion 14 which is clipped, in a manner known per se, onto the edge of the corresponding strip and is prolonged by a yoke 15 formed of two side plates or cheeks 16 and 17 respectively. Facing one another on the cheeks 16 and 17 are two lugs 18, 19 which, in the example shown, and as best seen in FIGURE 2 for instance, are in the form of a frustum having preferably an elliptical or oval base, the major axis of the ellipse or oval being normal to the longitudinal axis of element 12 or 13.

As may be seen especially in FIGURE 1, the elements 12 are so mounted along the edge of strip 10 that their plane of symmetry is substantially coincident with the median plane of strip 10, while the elements 13 are so mounted that their plane of symmetry is substantially normal to the median plane of element 11. The result is that to fit element 12 within element 13, it suffices to hold up the yoke of said element 12 opposite the yoke of element 13, at an angle of about 90° thereto. In such position, the major axes of lugs 18, 19 of element 12 are then parallel with the major axes of lugs 18, 19 of element 13, thus allowing for inter-engagement of these lugs. When elements 12, 13 are brought back into a horizontal plane, the major axes of lugs 18, 19 of element 12 are then normal to the major axes of lugs 18, 19 of the respective element 13, so that the two elements can no more be disengaged from each other.

To facilitate such inter-engagement of elements 12, 13, use is made according to the invention of a zip fastener which is shown from above in FIGURE 1 and along various sectional planes in FIGURES 2, 3, 4 and 5. As shown particularly in FIGURE 2, slider 20 comprises two guiding walls, viz. an upper wall 21 and a lower wall 22 which are in parallel relationship and are connected by a stand 23 located at the front of said slider. Walls 21 and 22 provide at their front portion two surfaces which form together an angle of 90° and are connected by an intermediate portion constituting a base for stand 23. The angle between these surfaces gradually increases towards the rear part of the slider until said surfaces come to lie into the same plane, as shown in particular in FIGURE 4.

On the other hand, it should be noted that there is provided, on wall 21 of the slider, side guiding means 24 arranged symmetrically about the longitudinal plane of the slider and extending towards the lower plate or wall 22. The purpose of these guiding means 24 will be more fully explained hereinafter. Slider 20 is mounted between the two strips 10 and 11, of which the edges carrying elements 12, 13 are fitted between the walls 21 and 22 of said slider and held in such position by the guiding means 24 provided on the upper wall 21 and which co-operate with elements 12, 13 to maintain such engagement.

The slider operates in an extremely simple manner: when the user draws the slider in the direction of arrow F, for instance by gripping tab 25, such elements 12 and 13 as lie immediately ahead of the slider will slide into the latter and thus assume positions at 90° with respect to each other, as shown in FIGURE 2. While the slider is moving forward in the direction of arrow F, elements 12, 13, being guided by guiding means 24, will be drawn nearer each other, while remaining at 90° with respect to each other, until they reach the position shown in FIGURE 3, whereat the lugs 18, 19 of each pair of elements 12 and 13 become inter-engaged. If the user then continues to draw the slider along arrow F, the inter-engaged elements 12, 13 will then be guided by the back portion of the slider. Since, as above-mentioned, the angle between walls 21 and 22 is increasing from this point on, until the surfaces of each wall 21 or 22 come to lie in the same plane, elements 12, 13 will therefore rock about each other until they also lie in the same plane. In this position, these elements 12, 13 are then locked together, since the major axes of lugs 18, 19 of the two elements are at an angle of about 90° to each other.

To open the fastener, it suffices to draw slider 20 in the direction opposite to arrow F. In this case, such elements 12, 13 as located within the slider are guided by the back part thereof until they reach the position of FIGURE 3, wherein they are at an angle of 90° to each other. In this position, the lugs 18, 19 of elements 12, 13 can easily clear one another, since their major axes are in parallel relationship. Due to the fact that, from this point on, the side guiding means 24 are more and more spaced apart, the respective elements 12, 13 are also brought apart and thus become disengaged.

It will be understood that the invention is by no way limited to the embodiment just described. More particularly, instead of locating, as shown by way of example, all the elements 12 on strip 10 and all the elements 13 on strip 11, it may prove advantageous to provide on both bands alternate rows of elements 12 and 13. Of course, in this case, the operation of the device will remain exactly similar to that just described, only the respective positions of elements 12 and 13 being different.

In the example shown in the drawing, the elements 12 and 13 are made of a material that will not lose its shape, such as metal, and are mounted on strips 10 and 11 made of fabric or the like. It may also be contemplated, notably with a view to facilitate the manufacture of the device, to make for instance the strips 10 and 11 of a synthetic material, preferably flexible, the elements 12 and 13 being in one piece therewith. On the other hand, it is also possible, where elements 12 and 13 are made of a flexible material such as a synthetic material, to provide lugs as 18 and 19 of a configuration different from that described and shown, for example cylindrical, conical with a circular base or of any other suitable shape. In this case, the elements such as 12 and 13 may be directly interfitted under the action of a mere pressure adapted to cause a separation of the cheeks 16, 17 and it will then be unnecessary, for interfitting the elements, to rock them by 90° through the slider 20. The slider used in this case may be of the conventional type used in the known zip fasteners.

Of course, many other modifications may be brought to the details of the zip fastener described above, without departing from the scope of the invention.

What I claim is:

1. A fastener of the zipper type including two facing one another bands, joining elements mounted on the edges of said bands, each joining element mounted on one band facing one co-operating element mounted on the other band, each joining element having the shape of a yoke provided with two internal side lugs facing each other, the plane of symmetry passing by the legs of said yoke of one element being normal to that plane of symmetry of said corresponding co-operating element.

2. A fastener according to claim 1, wherein said lugs assume the shape of frustrums solid with the legs of said yoke.

3. A fastener of the zipper type including two facing one another bands, joining elements mounted on the edges of said bands, each joining element mounted on one band facing one co-operating element mounted on the other band, each joining element having the shape of yoke provided with two internal side lugs facing each other, the base of which is substantially in the form of an ellipse having its major axis in a plane parallel with the band edge, the plane of symmetry passing by the legs of said yoke of one element being normal to that of said corresponding co-operating element.

4. A fastener of the zipper type including two facing one another bands, joining elements made in one piece with said bands and provided on the edges of said bands, each joining element provided on one band facing one co-operating element mounted on the other band, each joining element having the shape of a yoke provided with two internal side lugs facing each other, the base of which is substantially in the form of an ellipse having its major axis in a plane parallel with the band edge, the plane of symmetry passing by the legs of said yoke of one element being normal to that of said corresponding co-operating element.

5. A fastener according to claim 1, wherein all the joining elements mounted on one of said bands have their aforesaid plane of symmetry coinciding with the median plane of their supporting band, all the elements mounted on the other band having their plane of symmetry normal to the median plane of said other band.

6. A fastener according to claim 1, wherein said joining elements are so arranged that one element having its aforesaid plane of symmetry coincident to the median plane of its supporting band is adjacent to two elements having their plane of symmetry normal to said median plane, whereas one element having its plane of symmetry normal to said median plane is adjacent to two elements having their plane of symmetry parallel to said median plane.

7. A fastener according to claim 1 comprising a slider mounted between the two aforesaid bands and including guiding means co-operating with said joining elements bringing them closer and fitting them, said guiding means being provided with guiding surfaces bringing the elements closer to each other at an angle of about 90°.

8. A fastener according to claim 2, wherein all the joining elements mounted on one of said bands have their aforesaid plane of symmetry coinciding with the median plane of their supporting band, all the elements mounted on the other band having their plane of symmetry normal to the median plane of said other band.

9. A fastener according to claim 2, wherein said joining elements are so arranged that one element having its aforesaid plane of symmetry coincident to the median plane of its supporting band is adjacent to two elements having their plane of symmetry normal to said median plane, whereas one element having its plane of symmetry normal to said median plane is adjacent to two elements having their plane of symmetry parallel to said median plane.

10. A fastener according to claim 2 comprising a slider mounted between the two aforesaid bands and including guiding means co-operating with said joining elements bringing them closer and fitting them, said guiding means being provided with guiding surfaces bringing the elements closer to each other at an angle of about 90°.

11. A fastener according to claim 3 wherein all the joining elements mounted on one of said bands have their aforesaid plane of symmetry coinciding with the median plane of their supporting band, all the elements mounted on the other band having their plane of symmetry normal to the median plane of said other band.

12. A fastener according to claim 3, wherein said joining elements are so arranged that one element having its aforesaid plane of symmetry coincident to the median plane of its supporting band is adjacent to two elements having their plane of symmetry normal to said median plane, whereas one element having its plane of symmetry normal to said median plane is adjacent to two elements having their plane of symmetry parallel to said median plane.

13. A fastener according to claim 3 comprising a slider mounted between the two aforesaid bands and including guiding means co-operating with said joining elements bringing them closer and fitting them, said guiding means being provided with guiding surfaces bringing the elements closer to each other at an angle of about 90°.

14. A fastener according to claim 4, wherein all the joining elements mounted on one of said bands have their aforesaid plane of symmetry coinciding with the median plane of its supporting band, all the elements mounted on the other band having their plane of symmetry normal to the median plane of said other band.

15. A fastener according to claim 4, wherein said joining elements are so arranged that one element having its aforesaid plane of symmetry coincident to the median plane of its supporting band is adjacent to two elements having their plane of symmetry normal to said median plane whereas one element having its plane of symmetry normal to said median plane is adjacent to two elements having their plane of symmetry parallel to said median plane.

16. A fastener according to claim 4, comprising a slider mounted between the two aforesaid bands and including guiding means co-operating with said joining elements bringing them closer and fitting them, said guiding means being provided with guiding surfaces bringing the elements closer to each other at an angle of about 90°.

References Cited

UNITED STATES PATENTS 1,837,021 12/1931 De Groote _____ 24—205.13

FOREIGN PATENTS 506,818 10/1954 Canada.
258,129 9/1926 Great Britain.
277,964 1/1952 Switzerland.

BERNARD A. GELAK, *Primary Examiner.*